United States Patent Office 2,724,487
Patented Nov. 22, 1955

2,724,487

METHOD OF TREATING FRUIT FOR ORIENTATION

Robert B. Vaile, Jr., Palo Alto, Holger J. Jespersen, Menlo Park, and John W. Edgemond, Jr., Los Altos, Calif., assignors to S & W Fine Foods, Inc., San Francisco, Calif., a corporation of California No Drawing. Application June 28, 1951, Serial No. 234,148

4 Claims. (Cl. 198—33)

The present invention relates to the orientation of indented fruit, such as cherries, for example, and more particularly to a method of treating such fruit prior to orientation.

An object of the invention is to provide a method of treating indented fruit preserved in brine, to facilitate rotation by an orientation member.

Another object of the invention is to provide a method of orientation where fruit originally brined and rotated by an orientation member to have the indents thereof in a predetermined position, can be orientated to a percentage higher than possible with the brined fruit.

And, another object of the invention is to provide a simple process of treating brined fruit prior to indent orientation so that orientation percentage is increased.

Indented fruit such as cherries, for example, that are to be orientated with the indent in a predetermined position prior to pitting and processing are usually preserved in a syrupy brine basically comprising a solution in water of sugar, salt, and a small amount of sulphur dioxide. When it is desired to orientate this fruit prior to pitting, the fruit is customarily rinsed in water. placed in a shallow cup with the fruit at least partially resting on a wheel, rod, or other orientation member that can be rotated or otherwise moved or oscillated, to rotate the fruit in the cup by friction until the indent of the fruit registers with the orientation member and fruit rotation ceases. The fruit is then pitted in such a manner as to force the pit out through the indent area, thereby mutilating the fruit to the least possible extent. As the probability of the indent registering with the orientation member rises with the amount of fruit rotation, and the frictional coupling of a light fruit such as a cherry with the orientation member is small, every effort is made to insure easy rotation of the fruit in the cup. When fruit is briefly rinsed water, and then transferred to the orientating-pitting machine, it is still coated with a thin film of the brine syrup. This film of brine causes adhesion of the fruit to the walls of the receptacles or cups in which the fruit is being rotated, due to the high surface tension of the brine, thereby greatly slowing the fruit rotation, and in some cases preventing it. Maximum percentage orientation is not, in consequence, attained.

In accordance with the present invention, the brine is entirely removed from the surface of the fruit prior to exposure to the orientation device, the fruit preferably being wet only with plain water. The surface tension of the water is much less than that of the syrupy brine, and in addition the fruit surface becomes less slippery, thereby raising the frictional forces exerted between the fruit and the orientation member. Both of these conditions cause more certain fruit rotation with a given speed of operation of the orientation member. The end result is a higher percentage of fruit orientated.

In the preferred practice of the present invention, the brined fruit is drained and is preferably either soaked or sprayed with a detergent. A 1% solution in water of a detergent known as "Dreft" has been found satisfactory. Other detergents of similar type that are able to remove substantially all traces of the original brine will be found satisfactory.

The cleaned fruit is then rinsed in plain water to remove the detergent, and sent through the orientation-pitting machine wet with water only, as it has been found that fruit with a detergent film left thereon will orientate to even lower percentages than when covered with a brine film. This is probably because the fruit becomes very slippery from the detergent.

As a specific example, to show the improved result of the method of the present invention, a single lot of representative cherries sorted to about 20 mm. diameter was loaded in a coned cup ⅝ inch diameter at the bottom, having associated therewith as an orientation member a wheel 5/16 inch in diameter centrally projecting above the bottom of the cup .032 inch. The wheel in all cases was rotated to have a peripheral speed of 33 feet per second.

The cherries as removed from the brine were first rinsed in water only and run through the orientation device with random orientation at the start. A percentage orientation of 76.5% was obtained. These conditions very closely represent normal orientation practice.

The same lot of fruit was then washed with a 1% "Dreft" solution in water and again run through the same orientation device while still wet with the detergent solution. An orientation percentage of 67% resulted.

The same lot of cherries was then rinsed free of the detergent solution and run through the orientation device wet with a water film only. The orientation percentage then rose to 85.5%, an increase of nearly 10% over the percentage attained with fruit having a residual brine film thereon.

The example just above recited has been found to be typical of a substantial and useful increase in orientation percentage obtainable by substantially complete removal of the preserving brine from the fruit. The increase in quality of the pitted output, due directly to the higher percentage of orientation, makes it economical to go through the washing and rinsing steps disclosed herein prior to orientation.

The present invention has been described as being embodied in a particular form of specific apparatus only by way of illustration and not by limitation. It is therefore to be understood that the method is applicable to other apparatus, and that we do not limit ourselves in any way to the apparatus shown and described in the present application as various other apparatus embodiments utilizing the method, within the scope of the appended claims, may be adopted.

We claim:

1. The method of orientating cherries preserved in brine which comprises removing brine from the surface only of said cherries with a detergent solution, rinsing the detergent from said cherries with water, and rotating said cherries by frictional contact with the water wet fruit surface.

2. In the orientation of cherries preserved in a syrupy brine by the rotation of said cherries by frictional contact of an orientation member therewith, the method of increasing the coefficient of friction between fruit and member which comprises washing said fruit to remove all brine from the surface only of said fruit and wetting the fruit in plain water during said rotation.

3. Method in accordance with claim 2 wherein said brine is removed from the surface of the cherries by washing said fruit in a detergent.

4. Method in accordance with claim 2 wherein said brine is removed from the surface of the cherries by washing said fruit in a detergent and wherein said detergent is removed from the fruit by rinsing in plain water.

References Cited in the file of this patent

UNITED STATES PATENTS

| | | |
|---|---|---|
| 1,732,816 | Laucks et al. | Oct. 22, 1929 |
| 2,054,392 | Sharma | Sept. 15, 1936 |
| 2,238,970 | Carroll | Apr. 22, 1941 |
| 2,472,794 | Cothran | June 14, 1949 |
| 2,572,773 | Slagle | Oct. 23, 1951 |